United States Patent [19]

Fujita

[11] 4,062,026
[45] Dec. 6, 1977

[54] DATA RECORDING MEANS FOR USE IN A SINGLE LENS REFLEX CAMERA

[75] Inventor: Susumu Fujita, Kobe, Japan

[73] Assignee: Fuji Photo Film Co., Ltd., Minami-ashigara, Japan

[21] Appl. No.: 723,344

[22] Filed: Sept. 15, 1976

[30] Foreign Application Priority Data

Oct. 28, 1975 Japan .................... 50-130065
Feb. 17, 1976 Japan .................... 51-16637

[51] Int. Cl.² .................................. G03B 17/24
[52] U.S. Cl. .................................. 354/106
[58] Field of Search ............... 354/105, 106, 152, 166, 354/224, 225

[56] References Cited

U.S. PATENT DOCUMENTS 3,590,703  7/1971  Ono ............................ 354/106
4,028,713  7/1977  Ohashi et al. ............... 354/106

Primary Examiner—L. T. Hix
Assistant Examiner—M. L. Gellner
Attorney, Agent, or Firm—Sughrue, Rothwell, Mion, Zinn and Macpeak

[57] ABSTRACT

Data recording for a single lens reflex camera which comprises a data carrier assembly which carries at least two identical sets of data, a constant positional relationship being maintained between corresponding data items in the two sets. In any setting of the data carrier assembly a data item in one set is brought to a recording position from which the image of the data item is directed onto film material when the camera shutter is actuated, and the corresponding data item in the other set is brought to a viewing position from which the image thereof is constantly transmitted to the viewfinder eye-lens.

7 Claims, 8 Drawing Figures

DATA RECORDING MEANS FOR USE IN A SINGLE LENS REFLEX CAMERA

BACKGROUND OF THE INVENTION

1. Field of the Invention

The present invention relates to a means permitting recording of data on film simultaneously with photographing of scenes in a single lens reflex type camera. More particularly the invention relates to a data recording means which permits data which is subsequently recordable on film to be viewed in the viewfinder system of a single lens reflex camera.

2. Description Of The Prior Art

There are known various types of single lens reflex cameras provided with data recording means, consisting basically of a data carrier means provided inside a camera, optical system for projection of data onto film, and an externally actuable setting means. The data carrier means carries one or more series of data and is movable to different settings to bring different items of data or combinations of data items to a recording position, the data projection optical system causes the image of the content specified by the data carrier means, i.e., of data items currently at the recording position, to be directed onto a film frame simultaneously with actuation of the camera shutter means, and the setting means permits a photographer to move the data carrier means, in order to bring different items of data to the data recording position. None of the known types of single lens reflex camera provided with data recording means permits the content of data carrier means to be viewed in the viewfinder system of the camera. However, as is known, it is quite possible for the data carrier means or the connection means provided between the data carrier means and the setting means to become faulty, particularly after the camera has been in use for some time, with the result that content specified by the data carrier means does not correspond to the content specified by the external setting means or that particular items of data fail to be brought completely to the data recording position, and in this case, since the photographer has no means of checking recorded data content until film has been developed, there is the disadvantage that a number of photographs may be produced having incorrect or incomplete data items recorded thereon. In some cases, of course, one or more complete rolls of film may be exposed before the photographer is aware of a fault with the data recording means. In addition to this, even supposing the data recording means is functioning perfectly, in a conventional camera, viewal of a scene or object to be photographed and setting the data recording means require the camera to be held in two different positions, which is extremely tedious in natural history or other specialized photography work in which the data items recorded are serial code items changing with each film frame exposed. In amateur photography also employing a camera which records the dates of photographs, this necessity to hold the camera in different positions in order to set the data recording means or view a scene to be photographed is inconvenient, particularly for the photographer who only takes one or two photographs at a time at infrequent intervals, since it is easily forgotten to move the data recording means to the correct setting, with the result that incorrect dates are recorded on photographs.

It is accordingly an object of the invention to provide a data recording means which permits viewal of recordable data by a photographer in the normal process of viewing a scene to be photographed.

It is another object of the invention to provide a data recording means which is particularly suited to employment in a single lens reflex camera and permits a photographer to adjust specified data content and simultaneously view a scene through a camera viewfinder system.

It is a further object of the invention to provide a data recording means which is simple and compact in construction and may be easily provided in a conventional camera.

In accomplishing these and other objects according to the present invention there is provided in a single lens reflex camera a data recording means comprising at least one rotatably mounted disk which constitutes a data carrier means and defines on separate portions thereof identical series of data, the items of data in each series being provided at equal intervals whereby when the data carrier means is rotated to bring one item of data to a data recording position an identical item of data is brought to a viewing position. A data item at the viewing position is illuminated, either by external light passing through a dormer window element defined in a front wall portion of the camera or by a separately provided light source, and the image of the data item is directed by an optical system along a path close to the opaque front surface of the pentaprism in the camera viewfinder system, i.e., the pentaprism surface which is the front surface in terms of camera construction, and is then directed rearwards through a small transparent opening defined in the pentaprism front surface and to the viewfinder eye-lens, whereby a photographer observing a scene to be photographed through the camera viewfinder is immediately aware of the item of data which will be recorded together with a subsequently taken photograph. Thus, the photographer may check the content of the data and position thereof relative to a frame defined in the viewfinder and there is much less risk of production of photographs which carry incorrect data or are spoiled by incorrectly positioned data due to inadvertency of the photographer or incorrect functioning of the data setting means.

In the invention the data setting means is provided in the otherwise unused space in front of the viewfinder system and suitably comprises one or more wheels which are disposed vertically and parallel to the front and rear walls of the camera, and are rotatable to bring different items of data to the projection position. With this construction the photographer may rapidly and easily adjust data content while holding the camera in a normal position for taking a photograph, by using the index finger, for example, to turn the wheels, and there is also the advantage that in terms of overall outline of the camera there are no extra space or size requirements.

A better understanding of the present invention may be had from the following full description thereof when read in reference to the attached drawings in which like numbers refer to like parts, and FIG. 1 is perspective disassembly view of a data recording means according to one embodiment of the invention;

DESCRIPTION OF THE PREFERRED EMBODIMENTS

Figure 1:
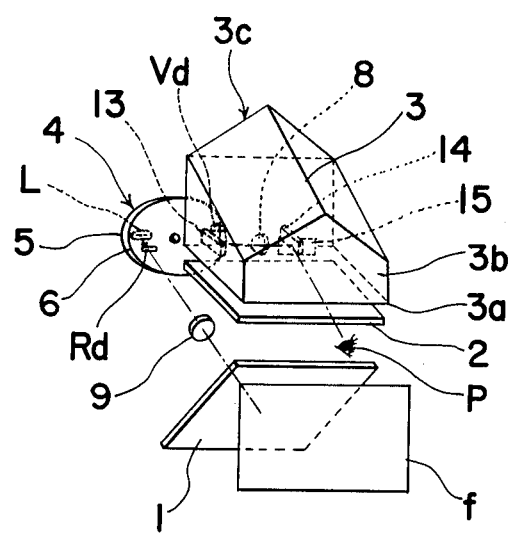

Referring to FIG. 1, there is shown schematically the interior of a single lens reflex camera comprising a reflecting mirror 1 which is normally disposed at an angle of 45° to the optical axis of a conventional taking lens system (not shown) and which lies between the taking lens system and a film frame $f$ which is brought in a known manner to an exposure station in the camera where it is held in a generally vertical alignment with respect to the optical axis of the taking lens system. When the mirror 1 is in its normal position image-wise light reflected from a scene to be photographed and entering the camera via the taking lens system is prevented from impinging on the film frame $f$ and is directed upwards by the mirror 1 to and through a focusing screen 2, and through the base surface 3a of a conventional pentaprism 3, to enter the pentaprism 3, which causes 90° reflection of the image-wise light resulting in direction of the image-wise light through the rearmost surface 3b of the pentaprism 3 to a known viewfinder eyelens, (not shown), provided in an upper rear portion of the camera, the base surface 3a and rearmost surface 3b of the pentaprism 3 being transparent, and the other surfaces thereof, or at least the upper rear surface and the lower front surface thereof, being silvered and it thus being made possible for a photographer to view a scene to be photographed as seen by the taking lens assembly. When the camera shutter means, (not shown) is actuated the mirror 1 is moved up to a horizontal position in order to permit exposure of the film frame $f$ and is then returned to its normal position in a known manner. Forward of the pentaprism 3 and near a lower left-hand portion thereof as seen by a person holding the camera directed towards the object to be photographed, there is provided a data carrier means or assembly 4 comprising disks 5 and 6 both of which are disposed in planes which are generally parallel to that of the film frame $f$, and are independently rotatable about a horizontal axis X, by externally actuable setting means described in greater detail below.

Figure 2:
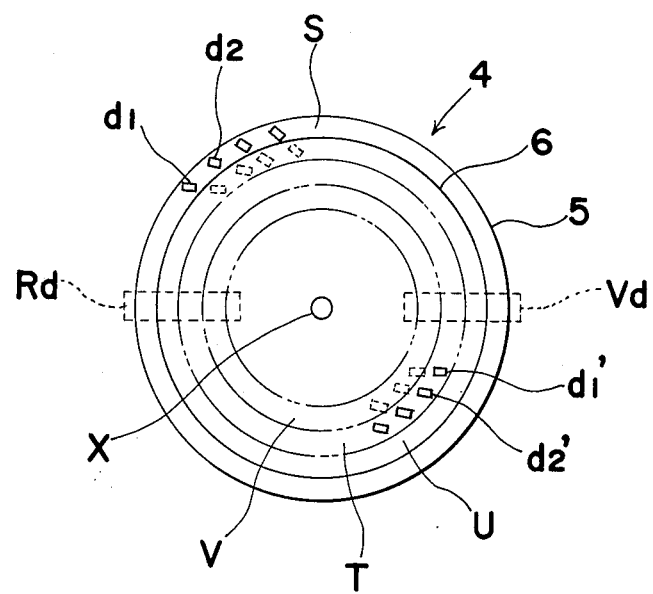
FIG. 2 is a plane view of a data carrier means employed in the means of FIG. 1.

As shown most clearly in FIG. 2, the disk 5 is constituted by concentric ring elements S and T which rotate together and are of equal width but which have different diameters, and the disk 6 is similarly constituted by ring elements U and V, the disks 5 and 6 being in close face-to-face relationship to one another, and the diameters and widths of the ring elements S, T, U, and V being such that as seen looking along the rotary axis X of the disks 5 and 6 the ring element S of the disk 5 is radially outermost, the ring element U of the disk 6 lies between the ring elements S and T of the disk 5, and the ring element V of the disk 6 is radially innermost. The ring element S of the disk 5 has marked thereon at equal intervals a series of data items $d1, d2, \ldots$, for example the numbers 1, 2, ..., and the ring element T is marked with a series of data items $d1', d2', \ldots$, which are spaced at the same equal intervals as the data items $d1, d2, \ldots$, and have the same content as the data items $d1, d2, \ldots$, i.e., if $d1$ is the number "1" and $d2$ the number "2" and so on $d1'$ is "1", $d2'$ is "2," and so on, but each of which is each out of radial alignment with the corresponding data item $d1, d2, \ldots$, and is separated therefrom by a definite angle such that when a data item $d1$ or $d2$ etc. on the ring element S which it is required to record on a photograph is brought of a data recording position in the camera, indicated at R$d$ in the drawing, the corresponding item of data $d1'$, or $d2'$, etc. is brought to a data viewing position in the camera, indicated at V$d$ in the drawing. The ring elements U and V of the disk 6 are similarly marked with similarly disposed series of data items. The disks 5 and 6 are suitably made of rigid, transparent plastic material and the data items carried thereby are marked in ink, paint or similar material, although other constructions, such as making the disks 5 and 6 of opaque material and defining data items therein by punched-out portions, are of course also possible.

Referring back to FIG. 1, in terms of the front-to-rear dimensions of the camera, the left-hand portion of the data carrier means 4, i.e., of each of the disks 5 and 6 in any particular settings, stands clear of the pentaprism 3 and is generally in line with the film frame $f$. The data recording position R$d$ is defined over a particular portion of this left-hand portion of the data carrier means 4 and is in line with a light source L and a focussing and relay lens 9. The light source L is provided forward of the data carrier means 4 and is actuated simultaneously with actuation of the camera shutter means. The focussing lens 9 is provided between the data carrier means 4 and the film frame $f$, and, when the light source L is actuated, directs onto a lower corner portion of the film frame $f$ a focussed image of the content specified by the data items currently at the data recording position. Depending on the degree to which the light source L may be regarded as a point source of light and on the amount of spacing between adjacent items of data on the ring elements S, T, U, and V, the data recording position may be simply defined by being in line with the light source L or there may be provided at the rear surface of the data carrier means 4 an opaque wall means in which an open portion defining the data recording position is formed.

Figure 5:
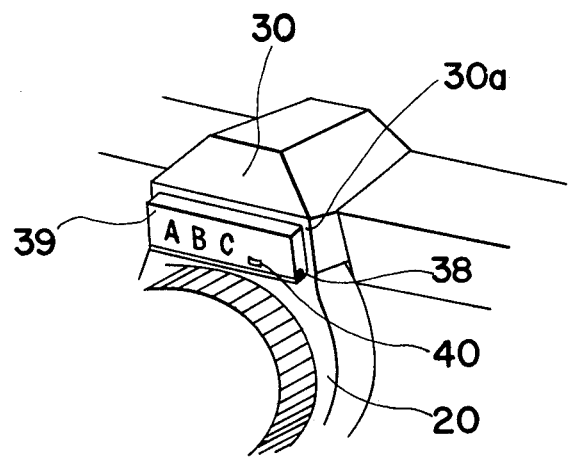
FIGS. 5 and 6 are perspective views showing a front portion of camera including the data setting means of FIG. 3 with a protective cover closed and opened respectively.
Figure 6:
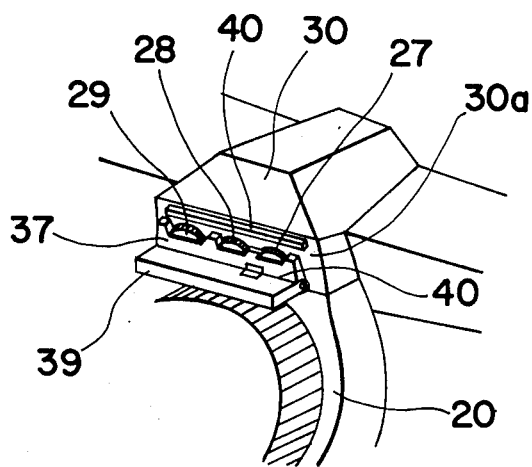

The data viewing position V$d$ is in line with a portion of the data carrier means 4 which faces the pentaprism 3. Data items at the data viewing position are illuminated by light entering through a dormer window element 40 which is provided forward of the carrier means 4 as shown in FIGS. 5 and 6 and is described in greater detail below. To the rear of the data viewing position there is provided a mirror 13 which is positioned at an angle of 45° to the path of light coming from the data viewing position, on which impinges image-wise light coming from illuminated data items located at the data viewing position, and which directs this image-wise light along a path which is close to and generally parallel to the base of the lower front surface 3c of the pentaprism 3, which passes through a focussing and relay lens 8, and which leads to a mirror 14 which is disposed parallel to the mirror 13, and is located near an opposite end portion of the lower portion of the lower front surface 3c of the pentaprism 3, i.e., near a lower righthand portion of the pentaprism front surface 3c as seen in FIG. 1. The portion of the pentaprism front surface 3c which is in a front-to-rear line with the mirror 14 is unsilvered whereby there is defined a small transparent opening 15 in the front surface 3c. The image-wise light carrying the image of the data items located at the data viewing position Vd is directed by the mirror 14 through the opening 15 and directly, without further reflection, through the lower portion of the pentaprism 3 to the viewfinder eyelens. In other words, when looking at a scene through the camera viewfinder system, the photographer P is immediately made aware of what the data content at the recording position Rd is, even if he or she had not previously thought of setting the data recording means, and the photographer may also note whether or not different items of data carried by the disks 5 and 6 and required to be included in the recorded data content have been correctly brought to the data recording position Rd, and may reset the data content or adjust positions of the disks 5 or 6 as necessary.

Needless to say it is not essential that the right-hand peripheral portion of the data carrier means overlap the front surface 3c of the pentaprism 3 as seen from the rear of the camera, but this construction has the advantage that overall camera construction is made more compact.

Referring now to FIGS. 3 through 6 there is shown one preferred form of data setting means employed in the data recording means according to the invention, the example of setting means construction shown being one employed in association with a data carrier means 4 comprising three disks 5, 6, 7 which are respectively marked with series of numbers indicative of days of the month, months, and years.

Figure 3:
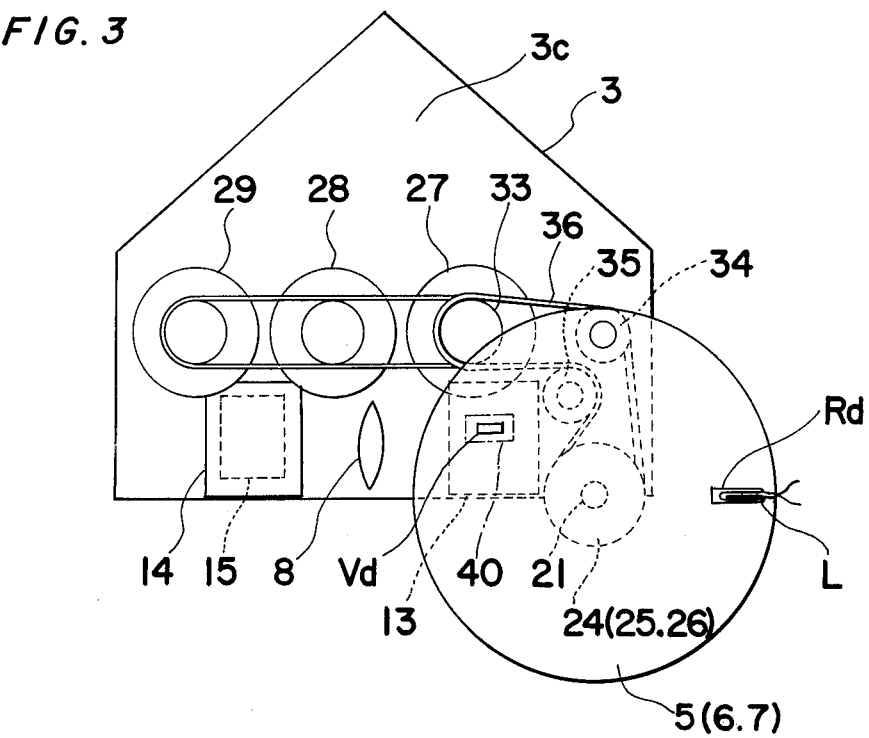
FIG. 3 is a schematized front view, on an enlarged scale, showing connections between a data setting means and the data carrier means in the means of FIG. 1.
Figure 4:
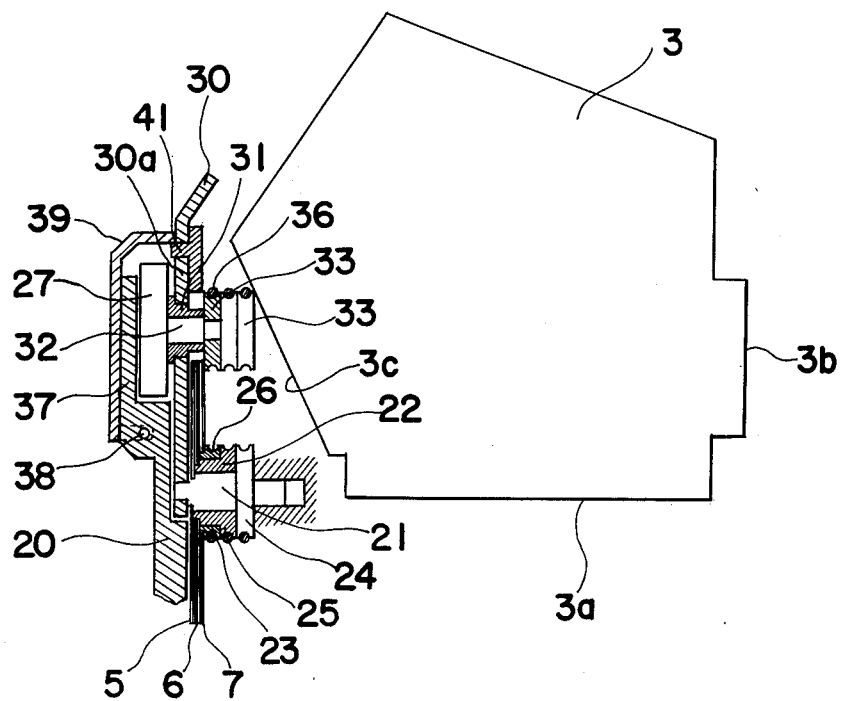
FIG. 4 is a front-to-rear, vertical cross-sectional view of the data setting means and data carrier means of FIG. 3.

In FIGS. 3 and 4, the disks 5, 6, and 7 are disposed vertically inside, and generally parallel to, the front wall 20 of the camera main body and in line with a lower corner portion of the pentaprism front surface 3c, and are respectively press-fitted or otherwise fixedly mounted on coaxial drive shafts 21, 22, and 23, which are provided in a triple-shaft arrangement permitting independent rotation of each of the shafts 21, 22, and 23, and hence of each of the disks 5, 6, and 7. Pulleys 24, 25, and 26 disposed in succession along the line of the rotatory axis of the shafts 21, 22, and 23 are fixedly mounted on and around the shafts 21, 22, and 23, respectively.

As shown most clearly in FIGS. 4 and 6, the camera has an upper covering case 30 which has a lower-end, vertical extension portion 30a extending the length of the camera front wall 20. On the outer side of the vertical extension portion 30a there are mounted setting wheel elements 27, 28, and 29 which are disposed vertically and generally parallel to the plane of the camera front wall 20 and are provided successively in right-to-left order as seen from the front of the camera, and each of which is fixedly mounted on the forward end of horizontally disposed driven shaft 32 which is rotatably supported in a bearing element 31 fixedly mounted in the covering case vertical extension 30a. Each shaft 32 projects beyond the inner side of the vertical extension portion 30a, and has fixedly mounted on the inner, i.e., rear, end thereof a pulley 33. A protective wall 37, which is fixedly or integrally attached to the camera front wall 20 encloses the entirety of the setting wheel elements 27, 28 and 29 except for small upper peripheral portions thereof, which stand clear of the protective wall 37 and may be contacted by the finger of a photographer who may therefore rotate each of the setting wheel elements 27, 28, and 29.

In FIGS. 3 and 4, the pulley 24 mounted on the drive shaft 21 of the disk 5 is connected to the pulley 33 mounted on the driven shaft 32 of the setting wheel element 27 by an endless belt 36 which is passed tautly around the pulleys 24 and 33 and around suitably located guide pulleys or rollers 34 and 35, which are provided to guide the belt 36 around a path which avoids the optical path between the mirrors 13 and 14 of the data viewing optical system. Thus, rotation of the wheel element 27 causes simultaneous rotation of the disk 5, which can therefore be rotated to bring any pair of identical numbers carried thereby to the data recording position Rd and the data viewing position Vd. There are provided similar belts and guide pulleys, (not shown) which similarly connect the pulleys 25 and 26 on the drive shafts 22 and 23 of the disks 6 and 7 to the pulleys 33 on the driven shafts 32 of the wheel elements 28 and 29, whereby the disks 6 and 7 also can be brought to required settings and the data carrier means 4 can be set to specify the appropriate date.

In FIGS. 4, 5, and 6 the upper peripheral portions of the setting wheel elements which project above the level of the protective wall 37 may be enclosed by a cover 39 which is pivotally mounted on pins 38 which are fixedly attached to opposite side portions of the lower end of the protective wall 37 and fit into holes defined in the lower ends of opposite sides of the cover 39. The cover 39 may be moved upwards into a closed position in which an upper rear edge portion thereof catches on a stop element 41 which projects forwardly from the downward vertical extension portion 30a of the case 30, as shown in FIG. 4 and FIG. 5. When the cover 39 is closed the setting wheel elements 27, 28, and 29 cannot be contacted at all and so are not liable to be accidentally moved out of required settings. The front of the cover 39 may of course be used as a name-plate or may be marked with a code identifying the camera, for example. If it is required to adjust the setting of the data carrier means 4 the cover 39 is swung downwards to the open position shown in FIG. 6, thereby exposing the upper peripheral portions of the setting wheel elements 27, 28, and 29 which are therefore now contactable and may be rotated as required in order to adjust the settings of the disks 5, 6, and 7.

In FIGS. 5 and 6, a dormer window unit 40 is formed in a lower portion of the cover 39 and case extension portion 30a, the dormer window unit 40 being in line with the data viewing position Vd and allowing external light to illuminate content specified by the data carrier means 4 at the data viewing position, while the light source L is provided in line with the data recording position Rd for exposing the setting data of the disks 5 and 6.

Although the setting wheel elements 27, 28, and 29 may of course be provided in another location, for example in vertical succession at the side of the camera, the abovedescribed setting means construction has the advantage that overall space occupied by the camera is practically unchanged since in terms of camera profile the setting means does not constitute an extra projection to the camera but is provided at the normally unoccupied, internal corner portion of the camera above the rear of the taking lens mount. For any position of the setting wheel elements 27, 28, and 29, since data content specified by the data recording means is seen in the viewfinder there is no necessity of marking the setting wheel elements 27, 28, and 29 with data items, and these wheel elements may therefore be small, giving the advantage of further compactness, and permitting the wheel elements to be placed close together where they are all easily contactable by one finger of a photographer holding the camera at eye-level in order to view a scene through the viewfinder. There is also of course the advantage that setting the data carrier means is simpler since it is easier to adjust the setting of any rotary element by turning the rotary element while observing a separately located setting indication, in this case the display in the viewfinder, rather than by turning the rotary element while observing a setting indicator marked actually on the rotary element.

Figure 7:
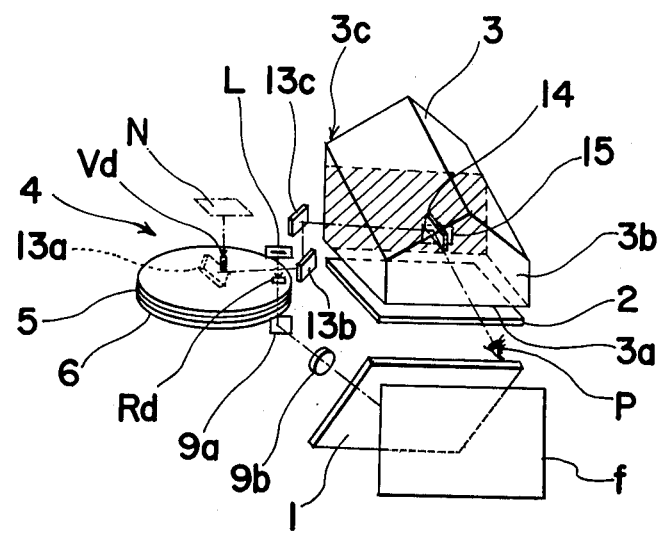
FIG. 7 is a perspective disassembly view showing a data recording means according to another embodiment of the invention.

Reference is now had to FIG. 7 which shows another embodiment of the invention in which the data carrier means is disposed horizontally adjacent to a left-hand portion of the pentaprism 3. The carrier means or assembly has the same construction as in the first embodiment and is moved to different settings in basically the same manner, except that if the setting wheel elements are disposed vertically drive therefrom is suitably transmitted first through gear elements which effect a 90° change in direction of drive transmission and drive pulleys which are connected by horizontally disposed belts to disk drive pulleys or directly to the disks 5, etc. of the carrier means 4. The light source L is positioned above the data carrier means 4 in line with the data recording position R$d$ and a reflecting mirror 9a which is provided below the data carrier means 4. When the light source L is actuated the image of the data currently at the data recording position is directed onto the mirror 9a, which directs the image through a relay and focussing lens 9b to a corner portion of the film frame $f$.

Above the data viewing position there is provided an illumination means N, which may be, for example, a dormer window unit defined in an outer wall portion of the camera, or an electrically actuated means provided inside the camera, and which illuminates data items at the data viewing location, whereby the image of these data items is directed onto a mirror 13a which is provided below the data carrier means 4 in line with the illumination means N and data viewing position, and which directs the image in a generally horizontal line in the direction of the pentaprism 3 to a mirror 13b. The miror 13b directs the image upwards to a mirror 13c which directs the image across the front of the lower portion of the pentaprism from wall 3c to the mirror 14 which, as described above, directs the image through the transparent opening 15, through the pentaprism 3, and to the viewfinder eyelens.

Figure 8:
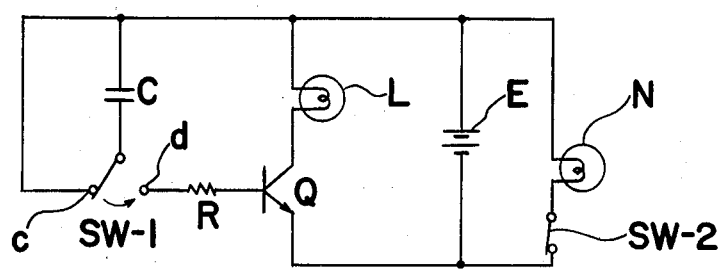
FIG. 8 is a circuit drawing of a circuit for illumination of data items.

Referring now to FIG. 8 there is shown a simple control circuit which may be suitably employed in either of the abovedescribed embodiments for actuation of the light source L for illumination of data at the data recording position R$d$. The circuit comprises a voltage source E having a positive terminal connected to one terminal of the light source L and to the upper plate of a capacitor C, the light source L and capacitor C being in parallel to the voltage source E and to one another. The opposite terminal of the light source L connects to the collector of an NPN transistor Q whose emitter connects to the negative terminal of voltage source E. The lower plate of capacitor C connects to a switch SW-1 which is normally closed on a contact $c$ connected to the positive terminal of voltage source E, and which upon actuation of the camera shutter means is caused, in a known manner, to move from contact $c$ and close on a contact $d$ which connects through a voltage-limiting resistor R to the base of NPN transistor Q.

In this circuit, the power supply circuit to light source L is normally open, but when the camera shutter means is actuated transistor Q is made conductive, and light source L is therefore lit, until capacitor C is fully charged, at which time bias to the base of transistor Q ceases, transistor Q stops conducting, and light source L goes out. When action of the shutter means is terminated switch SW-1 again closes on contact $c$, the control circuit thus being made ready for recording of data on the next photograph.

If illumination of data at the data viewing position is effected by an electrically actuated illumination means N, the means N is suitably included in the control circuit in series with a normally-closed switch SW-2 and the voltage source E, as indicated by the circuit portion to the right of the vertical dashed line in the drawing.

Needless to say, on the exterior of the camera there may be provided switch means actuable to prevent actuation of switch SW-1 of switch SW-2, or both. Such external switch means is particularly useful if, for some reason, it becomes impossible to adjust the setting of the data carrier means 4 by means of the setting wheel elements 27, 28, and 29 and it is therefore desired to temporarily prevent recording of data on photographs.

Although the present invention has fully been described by way of the examples with reference to the accompanying drawings, it is to be noted that various changes and modifications are apparent to those skilled in the art. Such changes and modifications, unless they depart from the true scope of the present invention, are to be construed as included within the scope of the present invention.

What is claimed is:

1. In a camera comprising a taking lens assembly, shutter means and a viewfinder system including a mirror which is normally disposed at an angle of 45° with respect to the optical axis of said taking lens system and positioned between said taking lens system and the frame of a film located at an exposure station and for directing image-wise light reflected from an external scene upwards to and through a focussing screen and into a pentaprism, said pentaprism having lower and rear surfaces which are transparent, and having at least the major portions of the other surfaces externally silvered and which causes said image-wise light to be directed to the eye-lens of the viewfinder system, and means for moving said mirror temporarily to a horizontal position to permit exposure of said film frame to said image-wise light upon actuation of said shutter means, and data recording means, the improvement wherein said data recording means comprises:

data carrier means constituted by at least one disk means which is rotatably mounted adjacent to said pentaprism and defines at least two identical series of data items, the same positional relationship on said disk means being maintained between all corresponding items of data in said series whereby when said disk means is rotated to bring one of said items of data in one of said series to a first position, a corresponding item of data in other said series is brought to a second position;

a data recording optical system including at least a lens means for focussing on said film frame the image of a data item positioned at said first position; and a data viewing optical system which directs the image of a data item at said second position from said second position along an optical path which lies forward of the base portion of said pentaprism, through a small transparent portion in the lower front surface of said pentaprism, and through said pentaprism to said eye-lens.

2. In a camera comprising a taking lens assembly, shutter means and a viewfinder system including a mirror which is normally disposed at an angle of 45° with respect to the optical axis of said taking lens system and positioned between said taking lens system and the frame of a film located at an exposure station and for directing image-wise light reflected from an external scene upwards to and through a focussing screen and into a pentaprism whose lower and rear surfaces are transparent, and at least the major portions of the other surfaces of which are externally silvered and which causes said image-wise light to be directed to the eye-lens of the viewfinder system, and means for moving said mirror temporarily to a horizontal position to permit exposure of said film frame to said image-wise light upon actuation of said shutter means, and data recording means, the improvement wherein said data recording means comprises:

data carrier means constituted by at least one disk means which is rotatably mounted adjacent to said pentaprism and defines at least two identical series of data items, the same positional relationship on said disk means being maintained between all corresponding items of data in said series whereby when said disk means is rotated to bring one of said items of data in one of said series to a first position, a corresponding item of data in other said series is brought to a second position;

light source means which is actuable upon actuation of said shutter means to illuminate a data item brought to said first position;

a data recording optical system including at least a lens means for focussing on said film frame the image of an illuminated data item positioned at said first position;

illumination means for illumination of a data item positioned at said second position;

a data viewing optical system which directs the image of an illuminated data item at said second position from said second position along an optical path which lies forward of the base portion of said pentaprism, through a small transparent portion in the lower front surface of said pentaprism, and through said pentaprism to said eye-lens; and externally actuable data setting means actuable to cause said data carrier means to bring successive corresponding data items to said first and second positions.

3. Data recording means as recited in claim 2, wherein said data setting means is provided in an upper protion of said camera forward of said pentaprism and comprises at least one wheel means which is rotatably mounted on shaft means provided interior of said camera and having at least a portion of the peripheral portion which projects exterior of said camera for manual contact by a photographer, drive connection means connecting said wheel means and said data carrier means, and a pivotally mounted cover means movable to a closed position wherein said cover means encloses said projecting peripheral portion of said wheel means and to an open position wherein said cover means exposes said projecting peripheral portion of said wheel means.

4. Data recording means as claimed in claim 3, wherein said illumination means is constituted by a dormer window means defined by said cover means and a corresponding wall portion of said camera and which permits illumination by external light of said data items successively brought to said second position.

5. Data recording means as claimed in claim 2, wherein said data carrier means is mounted adjacent to the forward corner portion of said pentaprism which is closest to said taking lens system and is disposed vertically and is rotatable about an axis which is generally parallel to the optical axis of said taking lens system, said light source means and said illumination means are located forward of said data carrier means, said data recording optical system is constituted by a single lens provided between the plane of said data carrier means and the plane of said film frame, and said data viewing optical system comprises a first mirror, first focussing and relay lens, and second mirror, said first mirror being provided rearward of said data carrier means and being disposed to direct the image of an illuminated data item at said second position along an optical path forward of said base portion of said pentaprism and generally normal to the optical axis of said taking lens system, said second mirror being positioned to receive image-wise light directed along said optical path by said first mirror and to direct said image-wise light through said pentaprism to said eye-lens, and said first lens being positioned on said optical path between said first mirror and said second mirror.

6. Data recording means as claimed in claim 2, wherein said data carrier means is disposed horizontally and is rotatable about a vertical axis, said light source means and said illumination means are provided above said data carrier means, said data recording optical system comprises a first mirror which is provided below said data carrier means and is disposed to direct the image of an illuminated data item at said first position along an optical path leading to said film frame and a first focussing and relay lens which is positioned on said optical path leading to said film frame, and said data viewing optical system comprises a second mirror which is positioned below said data carrier means and is disposed to direct image-wise light carrying the image of an illuminated data item at said second position along a generally horizontal optical path towards said pentaprism, a third mirror positioned to receive said image-wise light from said second mirror and disposed to direct said image-wise light upwards, a fourth mirror positioned to receive said image-wise light from said third mirror and disposed to direct said image-wise light along an optical path which extends along a line which is forward of the base portion of said pentaprism and is generally normal to the optical axis of said taking lens system, and a fifth mirror positioned to receive said image-wise light from said fourth mirror disposed to direct said image-wise light through said pentaprism to said eye-lens.

7. Data recording means as claimed in claim 2, wherein said illumination means is a normally actuated light emission source provided in said camera.

* * * * *